United States Patent
Hammerich

(10) Patent No.: US 10,989,476 B2
(45) Date of Patent: Apr. 27, 2021

(54) CLINKER COOLER AND METHOD FOR OPERATING A CLINKER COOLER

(71) Applicant: Alite GmbH, Neustadt (DE)

(72) Inventor: Jörg Hammerich, Neustadt (DE)

(73) Assignee: ALITE GmbH

(*) Notice: Subject to any disclaimer, the term of this patent is extended or adjusted under 35 U.S.C. 154(b) by 0 days.

(21) Appl. No.: 17/089,320

(22) Filed: Nov. 4, 2020

(65) Prior Publication Data

US 2021/0071956 A1   Mar. 11, 2021

Related U.S. Application Data

(63) Continuation of application No. PCT/EP2019/065527, filed on Jun. 13, 2019.

(30) Foreign Application Priority Data

Jun. 14, 2018 (EP) .................................... 18177718

(51) Int. Cl.
*B65G 25/06* (2006.01)
*C04B 7/47* (2006.01)
*F27D 15/02* (2006.01)

(52) U.S. Cl.
CPC ....... *F27D 15/0213* (2013.01); *B65G 25/065* (2013.01); *C04B 7/47* (2013.01); *B65G 2203/042* (2013.01); *F27D 2015/0226* (2013.01)

(58) Field of Classification Search
CPC ............. B65G 25/065; B65G 25/02; B65G 2203/042; F27D 15/0213; F27D 2015/0226; C04B 7/47
USPC .......... 198/750.1, 750.2, 750.6, 750.7, 750.8
See application file for complete search history.

(56) References Cited

U.S. PATENT DOCUMENTS

| | | | | |
|---|---|---|---|---|
| 2,473,445 A * | 6/1949 | Reed | ......................... | C21D 9/02 |
| | | | | 266/116 |
| 2,739,531 A * | 3/1956 | Hagerman | .......... | B41F 15/0872 |
| | | | | 101/126 |

FOREIGN PATENT DOCUMENTS

| | | | | |
|---|---|---|---|---|
| DE | 1985673 A | 5/1968 | | |
| DE | 2346795 A1 | 3/1975 | | |
| DE | 102010060759 A1 * | 5/2012 | ............. | B65G 25/04 |
| DE | 102010060759 U | 5/2012 | | |
| DK | 199901403 A | 4/2001 | | |
| EP | 0167658 A1 | 1/1986 | | |
| EP | 0718578 A2 | 6/1996 | | |
| EP | 1475594 A1 | 11/2004 | | |

(Continued)

OTHER PUBLICATIONS

European Patent Office. Extended European Search Report for application 18177718.6. dated Nov. 20, 2018.

(Continued)

*Primary Examiner* — Gene O Crawford
*Assistant Examiner* — Lester Rushin, III
(74) *Attorney, Agent, or Firm* — Yakov S. Sidorin; Quarles & Brady LLP

(57) ABSTRACT

A conveyor grate for conveying bulk material (preferably cement clinker) in a conveying direction, which has at least two conveying means and at least one motor for advancing such conveying means in the conveying direction and for retracting the conveying means, The grate can be installed and operated at reduced costs, if a first of these conveying means is coupled via a first clutch to the motor and a second of these conveying means is coupled via a second clutch to the same motor.

13 Claims, 3 Drawing Sheets

(56) References Cited

FOREIGN PATENT DOCUMENTS

EP  1992897 A1  11/2008
EP  3112786 B2  1/2017

OTHER PUBLICATIONS

International Searching Authority. International Search Report for application PCT/EP2019/065527. dated Jul. 11, 2019. 2 pages.

* cited by examiner

CLINKER COOLER AND METHOD FOR OPERATING A CLINKER COOLER

CROSS-REFERENCE TO RELATED APPLICATIONS

This application is a continuation from the international application PCT/EP2019/065527, which designates the United States and claims priority from the European Application No. 18177718.6 filed on 14 Jun. 2018 and now granted as EP 2 581867. The disclosure of each of the above-identified applications is incorporated herein by reference.

BACKGROUND

1. Field of the Invention

The invention relates to a conveyor for conveying and preferably as well for cooling bulk material, like e.g. cement clinker and to a method for operating a corresponding conveyor.

2. Description of Related Art

Clinker manufacturing includes calcination and sintering of raw meal to cement clinker, hereinafter "clinker" for short. Sintering takes place at about 1450° C., depending on the raw meal composition. The hot clinker is subsequently discharged to a clinker cooler. The clinker cooler receives the hot clinker and while conveying it to the next processing step, the clinker is cooled down. The clinker cooler has a conveyor floor on which the clinker forms a so called clinker bed with a typical height of about 0.5 m to 0.7 m. The construction of the grate floor is essential as on the one hand cooling air has to be inserted into the clinker bed via the grate floor and on the other hand clinker drop through the grate floor has to be avoided. In addition, the clinker has to be transported and the grate floor must withstand the high clinker temperatures and the abrasion caused by moving the clinker over the grate floor.

Presently, most clinker coolers are grate coolers that enable injection of a cooling gas from below the conveyor floor into a clinker bed residing on the conveyor floor, this being the grate floor. The cooling gas cools the clinker down and in turn is heated up. The heat being transferred to the cooling gas can be used as process heat.

For conveying the clinker a number of systems have been suggested, for example drag chain conveyors, i.e. systems based on conveying means that are moved forward above the grate surface and moved back to the kiln facing side of the grate below the grate. These systems mostly utilize chains to which the conveying means are attached (cf. EP 07 185 78 A2, FIG. 3). Belt or chain conveyors have been suggested as well (c.f. DE 23 46 795 or DE1 985 673). Modern clinker coolers, however, use reciprocating conveying means. This group of grate coolers can be separated in essentially two groups:

The first group addresses stepped grate coolers having rows of box-like grate elements that are mounted one besides another on cross beams. In operation, some of the cross beams reciprocate to thereby convey the clinker bed towards the cooler outlet. This type of clinker cooler has been discussed in several publications (e.g. in EP 0 167 658A) and is characterized in that the grate elements of each row reciprocate in phase. Mostly, all movable rows are in phase, as well.

Grate coolers of the second group have planks that extend in the conveying direction and which are arranged one besides of the other (with moving gaps in between). At least a number of planks are pushed forward simultaneously. Subsequently, the movable planks are retracted one after the other. This type is referred to as walking floor conveyor. To reduce costs, it has been suggested to group the planks. In this case the planks of all movable groups are advanced simultaneously and the groups are subsequently retracted one group after the other. A similar transport mechanism is as well used with other conveying means being arranged on or above a conveyor floor. Like the planks, these conveying means are arranged one besides another and they are advanced at the same time and retracted one after another or in groups. The second group of conveyors includes both the typical walking floor conveyors and conveyors having reciprocating conveying means that are advanced and retracted in essentially the same sequence as the planks of a walking floor conveyor. Walking floor clinker coolers are discussed, e.g. in EP 1 475 594, EP 1 992 897A or DK1 999 014 03, to name only a few.

DE 10 2010 060 759 A1 suggests a drive for a conveyor floor of trucks supporting unloading of transported goods. The drive converts a rotational movement of a motor driven shaft into a reciprocating movement of conveying means: The shaft is coupled to a number of discs each having a ring shaped slit, wherein the distance of the slit to the rotational axis varies as a function of the angular position. Into the slit of each disk engages a pin being attached to a drive lever. The lower end of the drive lever is pivotably supported and the upper end of the drive lever is attached to a pusher being movably supported on a guide rail. Thus, a rotation of the discs is converted into a translation of the respective pushers, to which the conveying means may be attached.

SUMMARY

The technical teaching presented herein is based on the observation that in present walking floor coolers each movable plank or each group of movable planks is driven by a separate hydraulic drive. These hydraulic drives each require hydraulic lines, at least one control valve and actuators configured for controlling these valves. Installation, operating and maintenance costs are thus high.

The problem to be solved by the invention is to reduce the installation and maintenance costs for walking floor type conveyors, e.g. walking floor type clinker coolers and other clinker coolers with reciprocating conveying means.

The conveyor grate enables the conveyance of bulk material, (such as, e.g., cement clinker) in a conveying direction. In case the conveyor grate is a conveyor grate of a clinker cooler, the conveying direction is defined by a vector pointing away from the clinker inlet, usually to or towards the clinker outlet of the clinker cooler (assuming the clinker cooler to be a single grate clinker cooler; which this is not necessarily the case, such assumption provides conceptual simplicity). The conveyor has at least two conveying means. These conveying means can be movable planks of the conveyor grate or groups of movable planks, wherein the planks of a group move synchronous. Static planks may exist as well. The static planks may be considered to form a separate group of planks. In some cases, the conveying means are positioned one besides of the other and supported by a linear-motion bearing enabling the conveying means to move relative to a basis parallel to the conveying direction which is parallel to the conveyor grate's longitudinal direction. This movement is referred to as reciprocating movement. In other words, the conveying means oscillate between an advanced and a retracted position.

There may be gaps in between at least some of the conveying means (e.g. to enable a coolant flow from below the grate floor into the bulk material on top of the conveyor grate). In case of a walking floor conveyor, the conveying means are not necessarily disposed directly one besides another, as there may be other components in between the two conveying means. Similarly, the conveying means of other conveyor types may as well be spaced from each other, e.g. to thereby enable a coolant flow through the conveyor grate and/or to provide moving gaps in between of neighbored grate elements.

The conveying means may as well include (or in some specific cases consist of) cross bars or other pushing means being movably supported on or above a conveyor grate and driven to be advanced in the conveying direction and retracted, subsequently. In this case the conveying means are as well arranged one besides of each other and are preferably configured to be advanced in the conveying direction at the same time and may be configured to be retracted by a movement opposite to the conveying direction. At least in case of walking floor conveyors, the at least two conveying means are preferably retracted at different times, preferably sequentially or in other words one after the other. Although, the retraction time intervals may overlap, this is not preferred, as it reduces conveying efficiency. By the movement sequence, bulk material can be transported in the conveying direction.

Thus, the process or action of advancing a conveying means can be expressed in other words as moving the conveying means in the conveying direction towards its front-end position. Retracting a conveying means can thus be considered to be a process of moving the conveying means in the direction opposite to the conveying direction towards its rear-end position. Thus, the conveying means can be considered to reciprocate for example one besides another between the two positions—the front and rear-end positions.

In short, the conveyor grate has at least two conveying means that may be arranged one besides the other. The conveyor grate includes at least a first conveying means and a second conveying means, wherein the two conveying means are preferably of the same type. For example, as set out above, the at least two conveying means may be planks, being arranged one besides of the other and forming at least a portion of the conveyor grate. In addition, the conveyor has at least one motor configured for advancing the at least two conveying means preferably at least essentially at the same time in the conveying direction and configured for retracting the at least two conveying means, for example separately from one another. Thus, the conveying means reciprocate. In other words, the conveying means are shifted forth and back and in this sense oscillate between their advanced position and their retracted position.

The motor is preferably an electric motor. Preferably, a first of the at least two conveying means is selectively coupled via at least one first clutch to the motor and/or a second of the at least two conveying means is selectively coupled via at least one second clutch to the same motor. Thus, a single (that is, one) motor is sufficient to drive the conveying means. By operating (i.e. opening or closing) the clutches the two conveying means can be decoupled or coupled, respectively, independently from each other to the same motor. "Coupled" means herein to establish a power transmitting coupling. In this particular example the coupling enables to transmit a torque (and a rotation) from the motor via a closed clutch to the respective conveying means. In case of a linear motor, a force is transmitted by the closed clutch. In current context, the term "selectively coupled" expresses that the coupling can be established by closing the respective/corresponding clutch and as well that the coupling can be released by opening the respective/corresponding clutch, and, in particular, that such operations with the clutches can be performed independently from one another. Changing the clutch state from an open state to a closed state and vice versa (that is, opening and closing the clutch) is preferably controlled by a controller that provides a control signal to the clutch. In short, a clutch is a selectively releasable coupling typically arranged between two shafts. "Selectively" means that the clutch is externally controlled. Changing the clutch state from the open to the closed state (or from the closed state to the open state) is thus controlled by an external control signal. (The term "external" refers to the clutch, not to the conveyor grate, obviously). For example, if the clutch is open, a rotation of one shaft has no effect on the other shaft and vice versa. The motor and the respective conveying means can move independently from each other, they are decoupled. If the clutch is closed, the two shafts are coupled such that a rotation of one shaft causes a rotation of the other shaft and vice versa. Some clutches have an intermediate state, so called slipping state in which only a portion of the torque being provided by one shaft is transferred to the other shaft. A mechanical clutch has an actuation means that can be moved to shift the clutch from the open into the closed position, sometimes via the slipping state. This movement provides a control signal to change the state according to the movement. There exist as well electromagnetic clutches and hydraulic clutches. A feature that all clutches have in common, is that that their switching states (that is, the states assumed by these clutches at a given time: open, closed, or optionally slipping) can be selectively changed, for example by changing the position or orientation of an actuation means with the use of a control signal. Electromagnetic clutches are mostly controlled by powering at least one coil, i.e. changing the current through the coil changes the state of the clutch.

For short, we will hereinafter refer to the first clutch and to the second clutch without intending to express that there is exactly one (that is, a single unit) of said clutches. When reference is made to a first clutch or a second clutch such reference should be understood as "at least one first clutch" and "at least one second clutch", respectively. The clutches enable the independent coupling and decoupling of the conveying means to the motor. Thus, e.g. by closing the first clutch and the second clutch, the two conveying means can be moved (e.g. advanced or retracted) simultaneously. By closing only one of the first and second clutches, only the respective conveying means is driven to be advanced or retracted. The opening of these clutches thus enables the user to jointly drive the conveying means when advancing the conveying means and subsequently to retract them one after the other (or in groups) when the respective clutches are being closed. As a result, only a single motor is required in the system instead of a respective motor for each of the conveying means.

In one example, however, the conveyor may have at least two motors being coupled to jointly drive the conveying means to thereby provide redundancy for driving the conveying means.

For example, the conveyor may include a main shaft. The main shaft is preferably coupled to the motor, e.g. via a reduction gear or some other transmission. The main shaft may be the rotor of the motor or alternatively a separate shaft. The main shaft may thus be driven by the (at least one) motor—and preferably by the single motor. The first conveying means may be coupled to a first linear drive configured for driving the first conveying means in the conveying direction and for retracting it, wherein the first linear drive has a first input shaft being selectively coupled to the rotor and/or a main shaft via the first clutch. Similarly, the second conveying means may be selectively coupled to a second linear drive configured for driving the second conveying means in the conveying direction and for retracting it, wherein the second linear drive has a second input shaft being selectively coupled to the rotor and/or a separate main shaft via the second clutch. For example, the at least one of the linear drives may include a crank or a crank shaft being selectively coupled via the first clutch to the rotor and/or the separate main shaft. The crank may be coupled via a connecting rod to the respective conveying means. A person of ordinary skill in the art will readily understand that such construction is cost efficient, durable, and enables to drive each conveying means independently from the other conveying means. An alternative cost efficient linear drive may include a worm onto which a nut slides forth and back depending on the rotational direction of the worm relative to the nut.

Preferably, the main shaft extends below the conveyor grate and is rotatably supported relative to a basis, e.g. (via) a conveyor housing. This enables an inexpensive and at the same time reliable conveyor. The motor preferably has a stator, which may be attached to the basis as well, e.g. as well via the housing. The motor's rotor and the main shaft are preferably coupled by a reduction gear. In a another embodiment, the main shaft is coupled at each end to a reduction gear being attached to a basis, e.g. (via) the conveyor housing.

At least one of the input shafts of the clutches is oriented at least essentially or substantially parallel (which means within ±10°, preferably within ±5°, particularly preferred within ±1° or even less) to the main shaft, thereby simplifying the transmission from the motor to the respective conveying means.

At least one of the input and/or output shafts of the clutches may be supported via at least one bearing by the conveyor housing (which in this case provides a mounting basis) or at least be firmly mounted to a mounting basis. This eases construction and maintenance and thus cuts costs down.

The conveyor may preferably include at least one of a first position sensor (configured to detect a position of the first conveying means) and a second position sensor (configured to detect a position of the second conveying means. If there are additional conveying means present, there is preferably at least one position sensor for at least one, preferably for all of such additional conveying means. In short, the system preferably includes a position sensor for each of the conveying means. In a preferred embodiment, the rotational position of the input shaft of at least one of the linear drives is measured by an angle sensor, enabling to determine the position of the respective conveying means and the direction of the movement. Thus, the angle sensor is in this context a particularly preferred embodiment of a position sensor.

The conveyor may include a controller (configured, generally, as electronic circuitry). The controller is preferably connected via at least one clutch control line to at least the first and second clutches and is configured for controlling and/or defining the engaging and disengaging of the first and second clutches and thus the operation of the conveying means. The controller may further be connected via at least one motor control line with the at least one motor, where such motor control line is configured to control the movement that is provided (or caused) by the motor. For example, the controller may be configured to control the rotational speed and/or direction of the motor via the control line. This enables to enhance conveying efficiency. For example, the controller may be configured to increase the speed of the motor and thus of the conveying means to a first speed when retracting the conveying means and decrease the speed to a second speed, when advancing the conveying means. In other words, the conveying means are advanced slower than they are retraced. Thereby conveying efficiency can be increased.

The speed of rotary motors is usually measured in "rpm" (revolutions per minute), but linear motors may be used as well. In the latter case, the speed is expressed in terms of the linear velocity of the motor's movable portion. The clutch then still couples and decouples the movable portion of the motor with the respective conveying means in response to the control signal.

The invention may as well be implemented by a method for conveying bulk material (such as cement clinker, for example) on a conveyor grate with at least a first conveying means and a second conveying means, wherein the first and the second conveying means are e.g. arranged one besides the other. The method may in particular be used to operate a conveyor as explained above. The method includes advancing the first and the second conveying means simultaneously and retracting the first and the second conveying means asynchronously. Simultaneously means at the same time, coexisting, but not necessarily in phase and/or with the same speed and/or amplitude. For example, the second conveying means may be advanced or moved after the process of advancing or moving of the first conveying means already started. In other words, there may be a preferably small-time delay r between starting to advance the first and the sec- and conveying means while the processes of advancing overlap in time. Preferably, the time delay r is small relative to the inverse of the frequency $f(v=1/f)$ of reciprocation. For example, $0<\tau<\alpha \cdot v$. Here, $\alpha$ is smaller than 1 ($0<\alpha<1$), preferably $0<\alpha \leq 0.1$, particularly preferably $0<\alpha \leq 1/36$ or even more preferably $0<\alpha \leq 1/72$ or $1/360 \leq \alpha \leq 1/72$. For example, if $\alpha=1/360$, the time delay $\tau$ causes an incoherency of the reciprocating movement (assuming the reciprocating movements to have the same amplitude) corresponding to a notation of a crank shaft (a 1° phase shift). As a result, the conveying means reciprocate almost in phase, but the breakaway torques do not accumulate, reducing construction, operating and maintenance costs.

The two conveying means are not necessarily required to reach their front-end positions at the same time, i.e. advancing of the conveying means may end at different moments of time. The term "asynchronous" as used herein inn-plies that there is at least a time interval in which only one of the conveying means is retracted. Preferably, only a single conveying means (e.g. a group of planks) is retracted at the same time. Preferably, the other conveying means is/are retracted once retraction of the initial single conveying means is finished. The intervals of time during which the retractions occur may overlap, but this is preferably avoided to avoid increase of the load on the drive and the situation when retraction of all conveying means is in-phase. Retracting a first conveying means at a first speed $v_1(t)$ and a second conveying means at a second speed $v_2(t)$, where $v_2(t) \gg v_1(t)$ or $v_1(t) \gg v\_2(t)$, is | considered to be asynchronous, at least if $|v_1(t)-v_2(t)| \geq 0.5 \cdot \text{Max}(|v_1(t)|, |v_2(t)|)$, where t is the time, $|x|$ is the absolute value of x, typically expressed as $|x|=\sqrt{x^2} \forall x$, and Max(x,y) provides the maximum value of x and y.

Advancing and retracting the conveying means is preferably controlled by operating a first clutch to thereby engage or disengage the first conveying means with at least one motor and by operating a second clutch, to thereby engage or disengage the second conveying means with the at least one motor. Thus, by closing both (at least one) clutches at the same time the conveying means can be advanced simultaneously. Once the two conveying means reach their front-end positions, one clutch may remain closed while the other(s) are opened. Now, only a single conveying means is retracted. Preferably, when it reaches its rear-end position, said one clutch is opened, i.e. the clutch is disengaged and the conveying means stops moving. An auxiliary clutch may be closed to thereby retract an additional conveying means. Once such additional conveying means reaches its corresponding rear-end position, the corresponding auxiliary clutch may be disengaged. In this way all conveying means may be retracted one after another by subsequently closing (and opening) one clutch after the other. Preferably, if all conveying means are at their rear-end position, the cycle starts again by advancing preferably all (at least a majority) of the conveying means by closing the respective clutches. Preferably, the motor is controlled accordingly as explained below.

In a preferred embodiment the speed of the motor is controlled to provide a first speed and/or torque while the clutches are open and/or closed, and to provide a second speed and/or torque while at least one of the clutches is operated to change its state from an open state to closed state or from a closed state to an open state, wherein the second speed is lower that the first speed. This arrangement reduces wear of the clutches and they can thus be dimensioned accordingly smaller. Reducing the speed and/or torque of the motor during operation of the clutches thus contributes to reducing installation and operating costs at the same time. In a particularly preferred embodiment, the motor is stopped for the time at least one clutch is closed and/or opened (i.e. operated) and is restarted after the new clutch state is established. This in turn enables to further cut down installation and operating costs. In this case the clutch can be a non-frictional clutch, e.g. a clutch having (at least) two parts that can be engaged into each other to provide a positive locking to engage the clutch and to disengage the two parts thereby releasing the positive locking. As apparent, above, the motor does not need to be stopped completely, but the torque being provided to the operated clutch should be reduced to 25% or less (preferably 15% or less, more preferred 10% or less, even more preferred 5% or less, particularly preferred 1% or less) of the maximum continuous torque of the clutch. Thereby, wear of the clutch can be reduced.

Above, we assumed that all conveying means are retracted one after the other and are advanced at the same time. But this assumption was made only to simplify presentation of the invention. Generalizing one may say that preferably more conveying elements are advanced (or not moved at all) than retracted at the same time (assuming equally effective conveying means).

Only to avoid misunderstandings and ambiguities, we recall that a clutch is a mechanical device which engages and disengages power transmission especially from a driving shaft to a driven shaft. The driving shaft is the input shaft of the clutch and the driven shaft is the output shaft of the clutch.

Above, the presented technical teaching is described with respect to a walking floor conveyor. However, the presented technical teaching can be applied to other conveying types as well, in particular to stepped grate coolers having reciprocating cross beams as conveying means. In this case, at least one of the cross beams is coupled to the at least one motor by at least one clutch. The remaining cross beams may be coupled to the motor by a clutch as well or without a clutch. By operating the clutch(es), the conveying speed can be adjusted for the respective section of the conveyor grate. The term "respective section" refers to the section of the conveyor grate, where conveying takes place by reciprocating at least one cross beam being coupled to the (at least one motor) by the respectively operated clutch(es).

Selectively coupling and decoupling at least one cross beam from the motor by closing or opening the clutch, respectively, can be used to homogenize the bulk material height on the conveyor grate, for example a clinker bed height: Discontinuous bulk material supply to the conveyor (for example by a kiln) can be compensated at least partially by selectively operating (at least) the at least one clutch. Thereby, the respective cross beam(s) is(are) decoupled from the motor and the conveying speed in the respective section of the conveyor is reduced.

For example, opening (preferably intermittently) the at least one clutch that connects at least one cross beam of the receiving section of the conveyor grate enables to reduce the conveying speed in the receiving section of the conveyor, and thus to compensate for a reduction in the bulk material delivery rate to the conveyor. Similarly, compensation for an enhanced bulk material delivery rate can be obtained by maintaining the at least one clutch connecting at least one cross beam of the receiving section of the conveyor grate closed and opening at least one clutch connecting at least one cross beam of a subsequent section of the conveyor grate.

By operating the clutch, not only the frequency of the reciprocating movement can be adjusted, but as well the stroke (i.e. the amplitude) of the respective conveying means. Thus, the amplitude of the conveying means can be reduced and/or the respective conveying means can be shut off while other conveying means continue to reciprocate. For example, the particular cross beam (or a set of cross beams) may be coupled to the motor by the clutch for every $n^{th}$ stroke only, wherein n can be any integer or a fraction. If n is an integer bigger than 1 (n>1), conveying is slowed down (or even shut off) in the respective section. If n equals one (n=1), the respective cross beams reciprocates like the other cross beams (assuming the remaining clutches are closed, as well). If n is smaller than 1 (n<1), clutches connecting the remaining cross beams with the motor are opened, accordingly the conveying in the remaining section(s) of the conveyor grate is reduced. This example can be read more generally by replacing the term cross beam by plank or any other type of reciprocating conveying means.

The scope of the invention has been explained with respect to various types of conveyor grates for clinker cooling. However, implementations of the invention are not limited to clinker cooling. The grate openings may as well be used for aeration, fluid removal, injecting of process gas, heating or other treatments of the material to be conveyed. Thus, the term clinker can be replaced by bulk material or even by material. If no grate openings are required, they can of course be omitted and the conveyor grate becomes a conveyor floor. Thus, the term "grate" can be replaced by "floor".

BRIEF DESCRIPTION OF THE DRAWINGS

In the following, the invention is described by way of example(s) of embodiment(s), without limitation of the general inventive concept and with reference to the drawings, of which.

Figure 1:
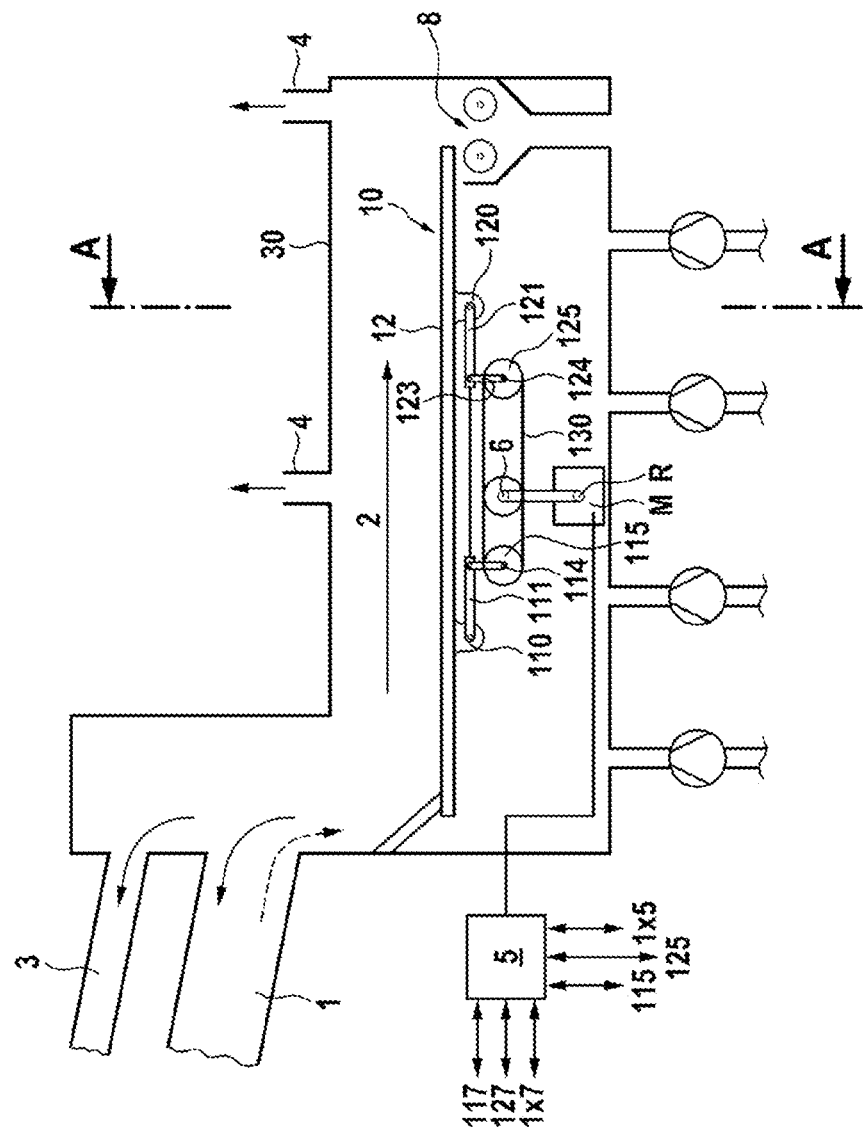
FIG. 1 shows a schematic sketch of a clinker cooler.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives fall-ing within the spirit and scope of the present invention as defined by the appended claims.

DETAILED DESCRIPTION

FIG. 1 shows a preferred embodiment of a conveyor floor. In particular, FIG. 1 shows a clinker cooler with an example conveyor floor. The side walls of the housing 30 have been omitted for the simplicity of illustration, and the coupling of a transmission 130 and the input shafts of clutches 115, 125 has been simplified. For a more accurate depiction, see FIG. 2.

The example conveyor has a conveyor floor 10, being in this example a conveyor grate 10 that includes planks 11, 12, 13 (see also FIG. 2) and may include a housing 30. The conveyor grate 10 receives clinker from a kiln 1 as indicated by the dashed arrow in FIG. 1. The clinker may be distributed by an optional clinker inlet distribution system, e.g. by the system being suggested in EP 3 112 786 B to provide a clinker bed on the planks 11, 12, 13 forming the conveyor grate 10. In FIG. 1, the optional clinker distribution system is depicted as a chute. The conveyor conveys the clinker or any other bulk material in the conveying direction 2 towards a clinker outlet, being symbolized by an optional crusher 8. The longitudinal directions of the planks 11, 12, 13 extend parallel to the conveying direction 2. The planks 11, 12, 13 are depicted as single piece items, but of course they can be segmented to ease manufacturing, transport, mounting and repair.

A gaseous coolant can be injected via the conveyor grate into the bulk material. The coolant in turn heats up and the heat can be used as process heat. For example, a portion of the heated coolant may enter the kiln (as indicated by an arrow pointing into the kiln 1), another portion may enter a tertiary air duct 3. Other portions may be withdrawn via at least one coolant release 4 from the cooler housing 30.

Figure 2:
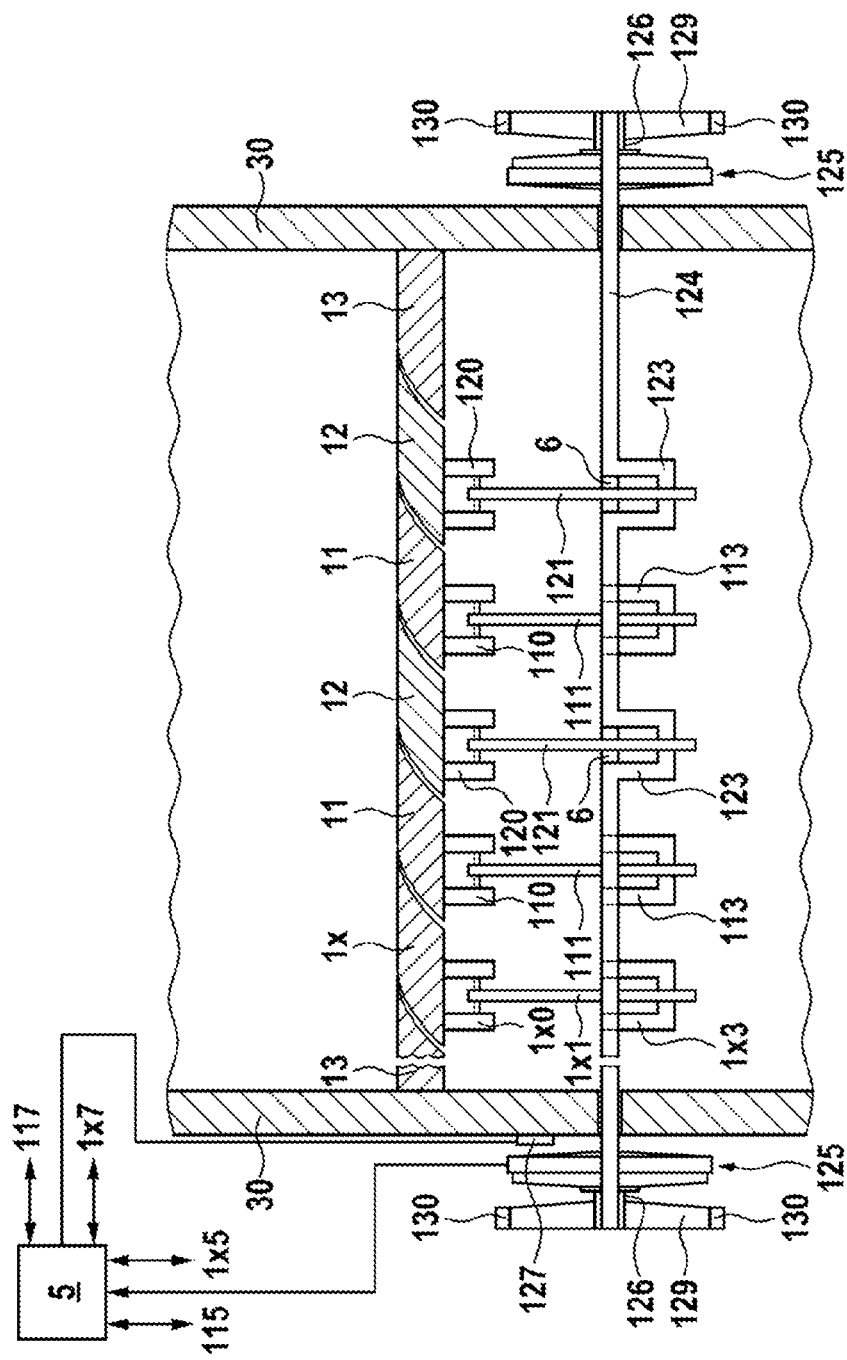
FIG. 2 shows a simplified cross section of the clinker cooler.

As explained above, the conveyor has a number of planks 11, 12, 13 as can be seen best in FIG. 2. Between the planks 11, 12, 13 there are moving gaps that may as well be used as grate openings for injecting a fluid, e.g. said coolant, from below the grate into the bulk material on top of the grate. Other suggestions for grate openings have been made in related art. Some of the planks may be static. In this example, the static planks are labeled with reference numeral 13. For simplicity of illustration, only two static planks 13 are indicated, but of course there may be more. For example, every fourth, third or even every second plank could be static. The other planks 11 and 12 are movably supported e.g. by plain bearings, rollers, a pendulum suspension and/or a hydrostatic bearing or the like. The indication of the movable support has been omitted to focus on the relevant portion of the application. The movable support enables the movable planks to reciprocate, i.e. to be pushed forward parallel to their longitudinal direction and to be retracted afterwards. To convey the bulk material, at least the majority of the movable planks can be advanced at the same time. Subsequently, a smaller number of planks is retracted at the same time until at least a majority of the movable planks can be advanced again. We referred to the specific number of planks for simplicity only, assuming that all planks essentially have the same surface areas (differing from one another within ±25%, preferably within ±15%, even more preferably within ±10%, or better yet within ±5% or less) for supporting the bulk material. However, it should be noted that the friction between the conveyor grate and the bulk material is the relevant magnitude: When pushing the bulk material forward, the friction between the bed of the bulk material residing on the grate and the non-advancing portions of the grate (including potentially not advancing conveying means) while advancing at least some of the conveying means must be smaller than the force the advancing conveying means exert on the bed of bulk material. The bed thus moves in the conveying direction 2 (i.e. forward). When retracting conveying means, the frictional force required for slipping the retracting conveying means backward should be lower than the (static) friction between the bed of the bulk material and the non-retracting portions of the conveyor grate. Thus, the bed of bulk material—essentially—does not move backwards. This is of course still a simplified picture, but it provides an idea of the fundamental concept.

The conveyor of FIG. 2 has as an example only two groups of movable planks: A first group of planks labeled by reference numeral 11 and a second group which is labeled by reference numeral 12. There could be as well further groups of movable planks, which could be driven in the same way as the first and the second group of planks 11, 12. Each plank 11, 12 of a group is advanced and/or retracted synchronously with the other planks 11, 12 of its group, but it may be advanced or retracted independently from the planks of the respective other group(s). Thus, more generally, each group of planks 11, 12 provides a (group of) conveying means.

The conveying means 11 of the first group (for short: first planks 11) are coupled to a first linear drive. As depicted, the first linear drive may include a first crank shaft 114. In FIG. 2 the first crank shaft is partially hidden by a second crank shaft 124 and a main shaft 6, but in FIG. 1 their relative positions are indicated. As can be seen best in FIG. 2, the first crank shaft 114 has first crank arms 113, to which first connecting rods 111 are movably attached, e.g. each by a rotary bearing. The other end of the connecting rods 111 is coupled, e.g. via another rotary bearing to first attachment means 110 of the planks 11. In short, a rotation of the first crank shaft 114 results into a synchronous reciprocating movement of the first planks 11 parallel to their longitudinal and thus the conveyor grate's longitudinal axis.

Similarly, the conveying means 12 of the second group (for short second planks 12) are coupled to a second linear drive. As depicted in FIG. 2, the second linear drive may include the second crank shaft 124. The second crank shaft 124 has second crank arms 123, to which second connecting rods 121 may be attached, again preferably by rotary bearings. The other end of the second connecting rods 121 may each be coupled, e.g. via another rotary bearings, to second attachment means 120 of the second planks 12. Thus, a rotation of the second crank shaft 124 results into a synchronous reciprocating movement of the second planks 12 parallel to the longitudinal axis of the conveyor grate.

Any number of further groups of conveying means, for example a further group of movable planks (for short further planks), could be coupled to further linear drives. Like the above example of first and second linear drives, the further linear drives may each include at last one further crankshaft being coupled via at least one further connecting rod to a corresponding further attachment means of the respective further plank(s).

The first, second and any optional further linear drive may be selectively coupled via at least one first clutch 115, at least one second clutch 125 and optionally by at least one optional further clutch to the same motor M. The motor M can be seen in FIG. 1, only. As apparent from FIG. 2, the crank shafts 114, 124 may preferably be rotatably supported by sidewalls of the conveyor housing 30. The output shafts of the second clutches 125 are attached to the second crank shaft 124, the latter is thus the driven shaft. Attaching the output shaft of a single clutch to any portion of the second crank shaft 124 would be sufficient. But two clutches 125 can be configured to provide redundancy. Alternatively, the two second clutches 125 and the crank shaft 124 may be dimensioned smaller to thereby reduce the costs. The input shaft 126 of each second clutch 125 is coupled via a transmission 129, 130 to the motor M. The first crank shaft 114 and any optional further crank shaft may be selectively coupled in practically the same way to the motor M. Only to avoid any misunderstanding, the output shaft of the first clutches 115 may be attached to both ends of the first crank shaft 114 and again, attaching the output shaft of a single clutch to any portion of the first crank shaft 114 would be sufficient. Again, two clutches 115 can be configured to provide redundancy. Alternatively, the two first clutches 115 and the first crank shaft 114 may be dimensioned smaller to thereby reduce the costs. The input shaft of each first clutch 115 is coupled via a transmission 119, 130 to the motor M.

There may be two or more motors M. But each group of conveying means is driven via its linear drive by at least one motor M that drives as well another group of conveying means, assuming the respective clutches to be closed.

In a preferred embodiment, the conveyor includes at least one position sensor 127. Depicted is only a single (second) position sensor 127 for monitoring the angular position of the second crank shaft 124 or more generally of the position of the second conveying means. In the example the position sensor 127 is positioned outside of the conveyor housing 30 and monitors the angular position of the output shaft of the clutch and thus indirectly the position of the second crank shaft 124. Particularly preferred, there is a position sensor for at least any group of conveying means, i.e. a position sensor 117 for the first group and a position sensor 1x7 for any further group (wherein x>2, e.g. 3, 4, ... ). The at least one position sensor is connected to a control unit 5, thereby enabling the controller 5 to obtain position sensor signals from the position sensor 127. The controller 5 preferably controls operation of the first and second clutches 115, 125 (and optionally of any further clutch being indicated by a link to 1x5 in FIG. 1 and FIG. 2) via corresponding control lines.

In FIGS. 1 and 2, each conveying means is driven only via a single linear drive. However, this is only an example. There may be more first, second or optional further linear drives for selectively transmitting the motor's power to the first, second or optional further conveying means, respectively. This is particularly helpful when long conveying means need to be driven, to thereby reduce bending moments on the conveying means. In FIG. 2 a further conveying means 1x is depicted, in FIG. 1 it has been omitted.

Figure 3:
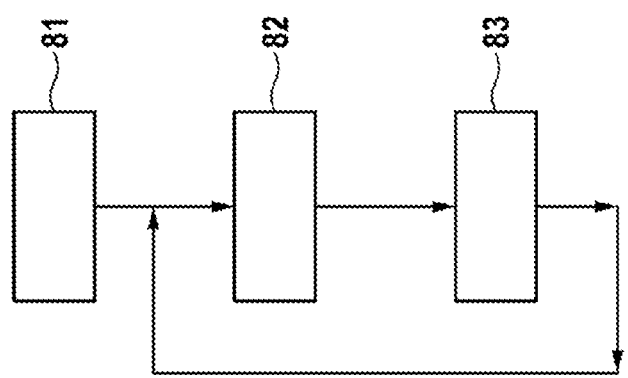
FIG. 3 shows a method for operating the conveyor.

A method for operating the conveyor is depicted in FIG. 3: Initially the motor M is shut off and all clutches are open (i.e. disengaged). The controller sends a control signal to close the at least one first clutch 115. Subsequently, the controller 5 controls the motor's rotor to rotate while monitoring the sensor signals of the first position sensor 117. Once the position sensor's signal indicates that the first conveying means 11 has reached its rear-end position, as well referred to as retracted position, i.e. the position where it is the closest to the conveyor inlet, the first clutch 115 may be opened by the controller 5. Preferably, the motor M is stopped while operating the clutch 115. The initializing step is repeated for the second and optional further groups of conveying means. In other words, the controller sends a control signal to close the at least one second (or further) clutch 125, (or 1x5). Subsequently, the controller 5 controls the motor's rotor to rotate while monitoring the sensor signals of the second (or further) position sensor 127 (or 1x7). Once the position sensor signal indicates that the respective conveying means has reached its retracted position, i.e. the position where it is the closest to the conveyor inlet the second (or further) clutch 125 (or 1x5) is opened by the controller 5. This sequence is referred to as initializing step 81.

Now, preferably all conveying means are in their retracted position. By closing the clutches 115, 125, 1x5 of the retracted conveying means 11, 12, 1x and controlling the motor's rotor to rotate, the respective conveying means 11, 12, 1x can be advanced at the same time, and preferably in phase, i.e. preferably synchronous (step 82). In an embodiment, the first, second and optional further clutches are closed, preferably one after the other, while the motor is powered during operation of at least the second and the optional further clutches, to thereby reduce the required torque (or in case of a linear motor, the force), i.e. to avoid that the initial breakaway torques (or forces) sum up. The first clutch may be opened when starting the motor as well, to enhance engine run up, but to avoid accumulation of breakaway torques this is not necessary. More generally speaking the operation of closing at least two of the clutches preferably takes place with a time delay, to thereby reduce breakaway torques (and/or forces). This measure enables to dimension the motor and the transmission smaller and thus to reduce manufacturing, maintenance, and operating costs.

The time delay r can be small relative to the inverse of the frequency f (v=1/f) of reciprocation. For example, $0<\tau<\alpha\cdot v$, wherein a is smaller 1 ($\alpha<1$), preferably $\alpha<0.1$, particularly preferred $\alpha<1/36$ or even more preferred $\alpha<1/72$. For example, if $\alpha=1/360$, the time delay causes an incoherency of the reciprocating movement corresponding to a rotation of a crank shaft. Thus, the conveying means are advanced almost in phase, but the breakaway torques do not accumulate, reducing construction and maintenance costs.

While advancing the conveying means, the controller 5 may monitor the position sensors 117, 127, 1*x*7 and open for example at least half of the clutches once the conveying means 11, 12, 1*x* reach their front-end position.

Subsequently, in step 83, the conveying means are retracted. Retraction preferably takes place groupwise, i.e. one group after the other. Staying with the above example, the first clutch may remain closed (alternatively the first clutch may be opened at the end of step 83 and subsequently be closed again) and the rotor rotates while the controller monitors at least the position of the first group of conveying means (by evaluating the position data of the first position sensor 117). Once the first conveying means 11 reaches its retracted position, the first clutches 115 are opened and the second clutches 125 are closed. During operation of the clutches, the rotor is preferably stopped, but continues to rotate once the new clutch states are established. The second clutches 125 are preferably opened, if a further group of conveying means needs to be retracted, once the second group of conveying means as well reaches its retracted position. If a further group of conveying means needs to be retracted, the respective further clutches are closed and the motor is powered to drive the group of further conveying means. During operation of the clutches, the rotor is preferably stopped (or at least the torque provided by the rotor is reduced). But the rotor continues to rotate once the new clutch state(s) is(are) established. Preferably, after all conveying means have been retracted, the method continues with step 82, i.e. at least a portion of the conveying means is advanced at the same time, again.

As mentioned above, when closing a clutch, the motor is preferably stopped until the clutch is engaged to thereby reduce wear and allow for use of simpler (and thus cheaper) clutches. If non-friction clutches are used it might be necessary to rotate the motor to positon the input shaft and the output shaft relative to each other but while closing the clutches essentially no torque should be transmitted by the clutches until they are fully engaged (in practice, the term "essentially no torque" means that if some residual torque nevertheless remains, its value is e.g. less than 25% of the max. continuous operating torque). Similarly, the torque of the motor is preferably as well reduced to essentially no torque while opening a clutch. As apparent from the above, opening and closing of a clutch is herein referred to as operating the clutch. In other words, if a clutch is operated, it changes its state from open to closed or vice versa.

It will be appreciated to those skilled in the art having the benefit of this disclosure that this invention is believed to provide a conveyor grate for conveying bulk material, like cement clinker. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 kiln
2 conveying direction, parallel to the longitudinal direction of the conveyor
3 tertiary air duct (optional)
4 coolant release opening
5 controlling unit/controller
6 main shaft
8 conveyor exit symbolized by a crusher
10 conveyor floor, e.g. a cooling grate of a clinker cooler
11 conveying means of the first group, e.g. plank of the first group of conveying means
12 conveying means of the second group, e.g. plank of the second group of conveying means
13 static plank
30 housing
81 initializing step
82 advancing step
83 retraction step
110 first attachment means
111 first connecting rods
113 first crank arm
114 first crank shaft
115 first clutch
117 position sensor of the first group of conveying means
120 second attachment means
121 second connecting rods
123 second crank arm
124 second crank shaft
125 second clutch
126 input shaft of the second clutch
127 position sensor of the second group of conveying means
129 part of transmission e.g. pulley
1*x* further conveying means (FIG. 2 only)
1*x*0 further attachment means (FIG. 2 only)
1*x*1 further connecting rod (FIG. 2 only)
1*x*3 further crank arm (FIG. 2 only)
1*x*5 further clutch
1*x*7 further sensor
130 part of transmission, e.g. a belt or a chain
M Motor
R Rotor

The invention claimed is:

1. A conveyor grate configured to convey bulk material in a conveying direction, the conveyor grate comprising:
   at least two conveying means, and
   at least one motor configured to advance the at least two conveying means at the same time in the conveying direction and to retract the at least two conveying means,
   wherein a first of the at least two conveying means is selectively coupled via a first clutch to the at least one motor and a second of the at least two conveying means is selectively coupled via a second clutch to the same at least one motor,
   wherein establishing of a respective selective coupling between the at least one motor and either the first or the second of the at least two conveying means includes closing a respective clutch of the first and second clutches, and releasing of said respective selective coupling includes opening the respective clutch.

2. The conveyor grate according to claim 1, wherein:
the at least one motor comprises a rotor, and
the first conveying means is coupled to a first linear drive configured to drive the first conveying means in the conveying direction and to retract the first conveying means, wherein the first linear drive has a first input shaft that is selectively coupled to the rotor via the first clutch, and
the second conveying means is coupled to a second linear drive configured to drive the second conveying means in the conveying direction and to retract the second conveying means, wherein the second linear drive has a second input shaft that is selectively coupled to the rotor via the second clutch.

3. The conveyor grate according to claim 2, including a main shaft that extends below the conveyor grate, is rotatably supported relative to a conveyor housing, is driven by the at least one motor, and is selectively coupled via the first clutch with the first conveying means and via the second clutch with the second conveying means.

4. The conveyor grate according to claim 2, wherein at least one of the first and second input shafts is oriented essentially parallel to the rotor.

5. The conveyor grate according to claim 2, wherein at least one of the first and second input shafts is oriented essentially parallel to the main shaft.

6. The conveyor grate according claim 3, wherein at least one of the first and second input shafts is supported via at least one bearing by the conveyor housing.

7. The conveyor grate according to claim 2, wherein at least one of the first and second input shafts is a crank shaft that is coupled via at least one connecting rod to at least one of the respective first and second conveying means.

8. The conveyor grate according to claim 1, wherein the conveyor grate has at least one of a first position sensor configured to detect a position of the first conveying means and a second position sensor configured to detect a position of the second conveying means.

9. The conveyor grate according to claim 1, comprising a controller that is connected via at least one clutch control line to the first and second clutches and that is configured to control engaging the first and second conveying means with the at least one motor and disengaging the first and second conveying means from the at least one motor by operating the first and second clutches, and wherein the controller is further connected via at least one motor control line with the at least one motor and is configured to define a movement provided by the at least one motor.

10. The conveyor grate of claim 1, wherein the at least one motor has a stator, wherein the stator is supported by a conveyor housing.

11. The conveyor grate of claim 1, wherein selective couplings between the at least one motor and the first and second of the at least two conveying means are configured to operate the first and second clutches independently from one another.

12. A method for conveying material with a conveyor grate with at least a first conveying means and at least a second conveying means, the method comprising:
advancing the first and the second conveying means simultaneously,
retracting the first and the second conveying means asynchronously, and
effectuating at least one of (a) operating a first clutch of the conveyor grate to thereby engage or disengage the first conveying means with at least one motor of the conveying grate, and (b) operating a second clutch of the conveyor grate to thereby engage or disengage the second conveying means with the at least one motor.

13. The method of claim 12, comprising:
controlling the at least one motor
to provide at least one of a first speed and a first torque while the first and second clutches are in either open or closed positions, and
to provide a second speed while at least one of the first and second clutches is operated to change its corresponding position from closed to open or from open to closed, wherein the second speed is lower than the first speed.

* * * * *